(12) United States Patent
Iino et al.

(10) Patent No.: US 7,674,402 B2
(45) Date of Patent: Mar. 9, 2010

(54) ELECTROCONDUCTIVE RESIN COMPOSITION AND MOLDED PRODUCT THEREOF

(75) Inventors: Tadashi Iino, Kawasaki (JP); Zenichiro Izumi, Kawasaki (JP)

(73) Assignee: Showa Denko K.K., Tokyo (JP)

(*) Notice: Subject to any disclaimer, the term of this patent is extended or adjusted under 35 U.S.C. 154(b) by 0 days.

(21) Appl. No.: 10/581,675

(22) PCT Filed: Dec. 3, 2004

(86) PCT No.: PCT/JP2004/018448

§ 371 (c)(1),
(2), (4) Date: Jun. 5, 2006

(87) PCT Pub. No.: WO2005/055351

PCT Pub. Date: Jun. 16, 2005

(65) Prior Publication Data

US 2007/0114497 A1    May 24, 2007

Related U.S. Application Data

(60) Provisional application No. 60/528,828, filed on Dec. 12, 2003.

(30) Foreign Application Priority Data

Dec. 5, 2003    (JP) .............................. 2003-407765

(51) Int. Cl.
*H01B 1/00*    (2006.01)
(52) U.S. Cl. .................... 252/511; 249/114.1; 264/102; 264/104; 429/30; 429/33; 429/40; 524/401; 524/495

(58) Field of Classification Search ................. 252/500, 252/511; 264/102, 104; 428/367; 524/495, 524/401, 496; 422/98; 429/30, 34, 44; 474/237; 525/93; 705/10; 249/114.1
See application file for complete search history.

(56) References Cited

U.S. PATENT DOCUMENTS

| | | | | |
|---|---|---|---|---|
| 5,213,736 A | * | 5/1993 | Sumita et al. | ................ 264/104 |
| 5,866,025 A | * | 2/1999 | Kataoka et al. | ........... 249/114.1 |
| 6,290,767 B1 | * | 9/2001 | Bergemann et al. | ......... 106/472 |
| 6,315,956 B1 | * | 11/2001 | Foulger | ....................... 422/98 |

(Continued)

FOREIGN PATENT DOCUMENTS

EP    0337487 A1    10/1989

(Continued)

OTHER PUBLICATIONS

Ketjenbalck EC-600JD: http://www.akzonobel-polymerchemicals.com/PolymerChemicalsPDS/showPDF.aspx?pds_id=260.*

(Continued)

*Primary Examiner*—Mark Kopec
*Assistant Examiner*—Khanh Tuan Nguyen
(74) *Attorney, Agent, or Firm*—Sughrue Mion, PLLC

(57) ABSTRACT

An electroconductive resin composition, comprising at least: a multi-component polymer-type resin binder (A) comprising a dispersed phase and a continuous phase, and having a number-average particle size of dispersed phase of 0.001-2 μm, and an electroconductive material (B) in the form of powder and/or fiber. The electroconductive resin composition may preferably be used for a fuel cell separator.

20 Claims, 2 Drawing Sheets

U.S. PATENT DOCUMENTS

| | | | |
|---|---|---|---|
| 6,331,586 B1 * | 12/2001 | Thielen et al. | 524/401 |
| 6,489,026 B1 * | 12/2002 | Nishimura et al. | 428/367 |
| 6,572,997 B1 * | 6/2003 | Iqbal et al. | 429/34 |
| 7,008,991 B2 * | 3/2006 | Takagi et al. | 524/496 |
| 7,247,674 B2 * | 7/2007 | Kitano et al. | 525/93 |
| 2001/0016531 A1 * | 8/2001 | Morikoshi et al. | 474/237 |
| 2002/0051903 A1 * | 5/2002 | Masuko et al. | 429/44 |
| 2002/0180088 A1 * | 12/2002 | Hashiguchi et al. | 264/102 |
| 2002/0183438 A1 * | 12/2002 | Amarasekera et al. | 524/495 |
| 2003/0135405 A1 * | 7/2003 | Townsend et al. | 705/10 |
| 2003/0191228 A1 * | 10/2003 | Noguchi et al. | 524/495 |
| 2004/0058214 A1 * | 3/2004 | Mehler et al. | 429/30 |
| 2006/0027790 A1 * | 2/2006 | Arai et al. | 252/500 |

FOREIGN PATENT DOCUMENTS

| | | | |
|---|---|---|---|
| JP | 02-113068 | * | 4/1990 |
| JP | 10-204305 | * | 8/1998 |
| JP | 11-163589 | * | 6/1999 |
| JP | 2000-348739 | * | 12/2000 |
| JP | 2001-195919 | * | 7/2001 |
| JP | 2003-183461 | * | 7/2003 |
| JP | 2003-268249 | * | 9/2003 |
| WO | WO 02/49412 A1 | | 6/2002 |
| WO | WO 2004/059663 A1 | | 7/2004 |

OTHER PUBLICATIONS

Patent Abstracts of Japan, vol. 2000, No. 15, Apr. 6, 2001 & JP 2000 348739 A (Mitsubishi Plastics Ind Ltd), Dec. 15, 2000.

* cited by examiner

Fig.2
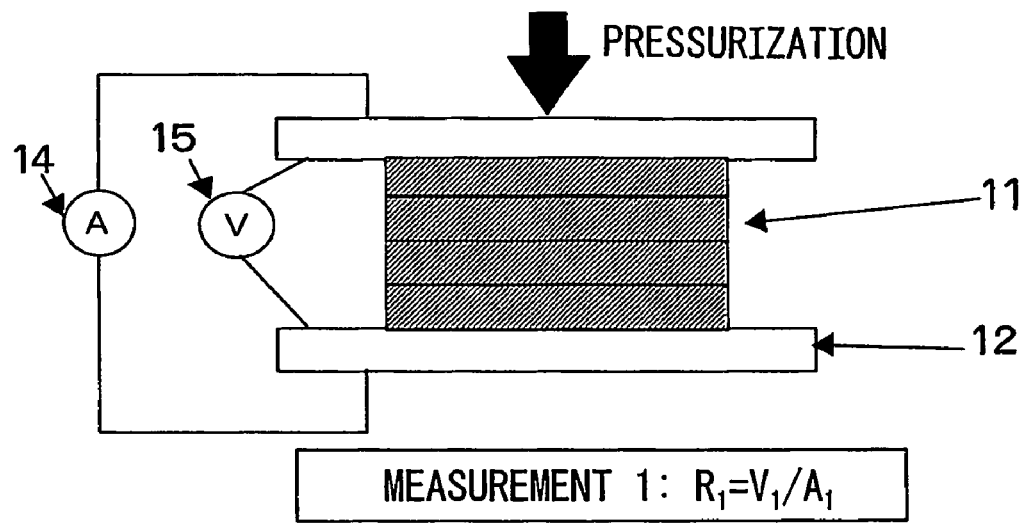
MEASUREMENT 1: $R_1 = V_1/A_1$
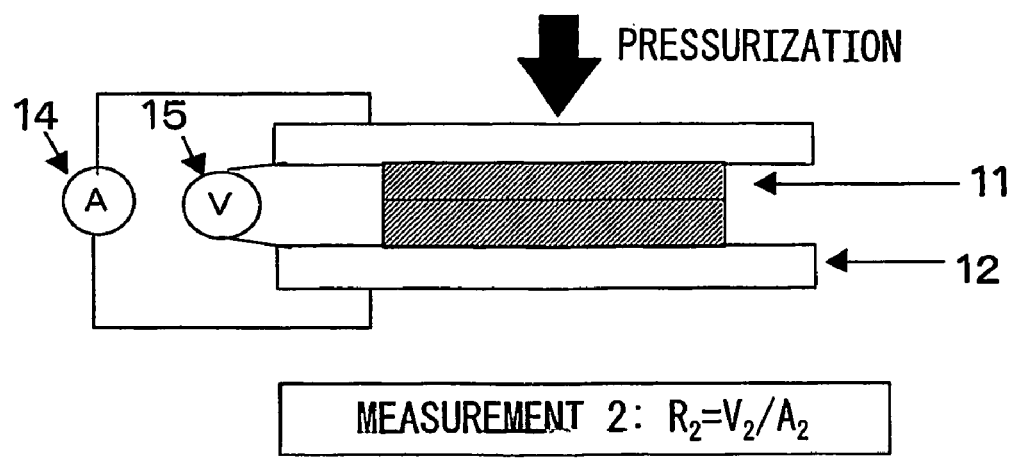
MEASUREMENT 2: $R_2 = V_2/A_2$

ELECTROCONDUCTIVE RESIN COMPOSITION AND MOLDED PRODUCT THEREOF

This application claims the priority of an application based on U.S. Provisional Application Ser. No. 60/528,828 (filed on Dec. 12, 2003).

TECHNICAL FIELD

The present invention relates to an electroconductive composition. More specifically, the present invention relates to an electroconductive composition which comprises at least an electroconductive substance and a matrix useful for providing a high electroconductivity; a molded product and a fuel cell separator which are obtainable from such an electroconductive composition, and have an excellent contact resistance.

BACKGROUND ART

Heretofore, certain electroconductive materials such as metals and carbon materials have been used in fields wherein a high electroconductivity is required. On the other hand, in recent years, electroconductive materials have been used in various ways in many fields such as electronics, electrochemistry, energy and transportation equipment. Along with such usage of the electroconductive materials, an electroconductive resin composition, as a kind of the electroconductive material, have played a more important role. As a result, the electroconductive resin compositions have made remarkable progress so as to permit higher performances and higher functions. Particularly, the degree of freedom of the molding workability thereof is expanded due to the combination of the-mentioned electroconductive material and a polymer material, and this is a strong reason why the electroconductive resin compositions have been remarkably developed.

In the field of the electroconductive resin composition, it is important to effectively provide an electroconductivity, substantially without impairing the mechanical characteristic and molding characteristic thereof. For example, Patent Document 1 discloses a method of mixing two or more kinds of polymers which are not completely compatible with each other so as to provide a matrix, so that a filler for imparting an electroconductivity is predominantly distributed in one of the polymers having a larger affinity therewith.

Recent examples of the usage or application for the electroconductive resin composition in which the electroconductivity is required, may include: in addition to the conventional applications, electronic materials such as circuit boards, resistors, laminates, and electrodes; and various members such as heaters, members constituting heat-generating devices, dust-collecting filter elements, PTC (positive temperature coefficient) elements, electronics elements or parts, and elements or parts to be used in the semiconductor industry. In these applications, a high thermal resistance is required together with an electroconductivity.

On the other hand, in view of environmental problems and energy problems, fuel cells have attracted much attention as clean power-generating devices, because they generate electric power by a reverse reaction of electrolysis by using hydrogen and oxygen, and they produce no exhaust material other than water. Also, in the field of the fuel cell, the electroconductive resin compositions have important roles.

The fuel cells can be classified into several kinds, depending on the kind of the electrolyte to be used therefor. Among such fuel cells, solid polymer electrolyte-type fuel cells can work at a low temperature, and therefore they are most useful for automobile or public or civilian uses. This type of fuel cell is constructed by stacking unit cells, each of which comprises, e.g., a polymer electrolyte, a gas diffusion electrode, a catalyst and a separator, and the fuel cell can attain high-output power generation.

In the fuel cell having the structure, the separator for partitioning the unit cells usually has at least one flow channel (or groove) to which a fuel gas (such as hydrogen) and an oxidant gas (such as oxygen) are supplied, and from which the produced water content (steam) is discharged. Therefore, the separators is required to have a high gas impermeability capable of perfectly separating these gases, and is also required to have a high electroconductivity to reduce the internal resistance. Further, the separator is required to be excellent in heat conductivity, durability, strength, etc.

To satisfy these requirements, the separator has been heretofore studied in view of both aspects of metal and carbon materials. Among these materials, metals have a problem in the corrosion resistance thereof and therefore, an attempt has been made to cover the surface thereof with a noble metal or carbon. However, in such a case, a sufficiently high durability cannot be obtained and moreover, the cost for covering the metal is problematic.

On the other hand, a large number of carbon materials have been studied as materials for constituting fuel cell separators, and examples thereof include a molded article obtained by press-molding an expanded graphite sheet, a molded article obtained by impregnating a carbon sintered body with a resin and curing (or hardening) the resin, a vitreous carbon obtained by baking a thermosetting resin, and a molded article obtained by mixing a carbon powder and a resin and molding the resultant mixture.

For example, Patent Document 2 discloses a complicated process such that a binder is added to a carbon powder and mixed under heating, the mixture is CIP (Cold Isostatic Pressing)-molded, baked and graphitized, and the thus obtained isotropic graphite material is impregnated with a thermosetting resin and subjected to a curing treatment, and grooves are engraved therein by cutting.

In addition, attempts have been made for the purpose of enhancing the performances of the separator by improving the composition to be used therefor. For example, Patent Document 3 discloses a separator which is excellent in both of the mechanical and electric characteristics, based on the composite of a carbon powder coated with a resin and a resin having a higher thermal resistance than the coating resin. Patent Document 4 discloses a resin composition comprising a mixture of a low-melting point metal, a metal powder, a thermoplastic plastic and a thermoplastic elastomer.

On the other hand, it is important to lower the contact resistance of a separator, and the technique therefor has been studied in various ways. For example, Patent Document 5 discloses a method of increasing the area rate of carbon powder, by grinding the surface layer of a separator predominantly comprising a resin.

[Patent Document 1] JP-A (Japanese Unexamined Patent Publication) 1-263156
[Patent Document 2] JP-A 8-222241
[Patent Document 3] JP-A 2003-257446
[Patent Document 4] JP-A 2000-348739
[Patent Document 5] JP-A 2003-282084

In the-mentioned various kinds of molded products comprising the conventional electroconductive resin compositions, it is necessary to increase the amount of an electroconductivity-imparting material to be contained in the molded product in order to impart the molded product with a high electroconductivity. On the other hand, in such a case, it is also inevitable to increase the amount of a resin to be contained in the molded product. Accordingly, it is impossible to obtain a sufficiently high electroconductivity.

In addition, because of the large amount of the electroconductivity-imparting material contained in the molded product, the surface of the resultant molded product inevitably has a low smoothness, and a higher hardness, so that the contact resistance of the molded product produced from of an electroconductive resin composition tends to be deteriorated. In addition, when the surface of the molded product is covered with the binder resin, and the contact resistance thereof is deteriorated, it is necessary to adopt a method of grinding the surface the molded product.

Further, when the production process includes a baking step of heating the molded product at a high temperature of 1000-3000° C. for a long period so as to obtain a high electroconductivity, the time required for producing the molded product becomes longer, and further the production steps become complicated, and the production costs problematically become high.

DISCLOSURE OF INVENTION

An object of the present invention is to provide an electroconductive resin composition which has solved a problem encountered in the prior art (particularly, which has a low contact resistance, and penetration resistance), and a molded product to be produced therefrom.

Another object of the present invention is to provide a fuel cell separator which has an excellent electroconductivity and can be produced from the composition though molding.

As a result of earnest study, the present inventors have found that a high electroconductivity can be provided by using a specific resin binder comprising a dispersed phase and a continuous phase, and have accomplished the present invention.

The present invention is based of the discovery. More specifically, For example, the present invention may include the following embodiments [1]-[16].

[1] An electroconductive resin composition, comprising at least:
a multi-component polymer-type resin binder (A) comprising a dispersed phase and a continuous phase, and having a number-average particle size of dispersed phase of 0.001-2 µm, and
an electroconductive material (B) in the form of powder and/or fiber.

[2] An electroconductive resin composition according to [1], wherein the component (A) constitutes 40-2 mass %, and the component (B) constitutes 60-98 are mass %, based on the total amount of (component (A)+component (B)) of 100 mass %.

[3] An electroconductive resin composition according to [1] or [2], wherein the number-average particle size of the dispersed phase in the component (A) is smaller than the number-average particle size or number-average fiber diameter of the component (B).

[4] An electroconductive resin composition according to any of [1]-[3], wherein at least one component contained in the component (A) is an elastomer component.

[5] An electroconductive resin composition according to any of [1]-[4], wherein the component (A) comprises 1-99 mass % of a thermoplastic resin, and 99-1 mass % of an elastomer.

[6] An electroconductive resin composition according to any of [1]-[5], wherein the component (A) comprises a composition of a polyolefin, and one or plural kinds selected from: hydrogenated styrene-butadiene rubber, styrene-ethylene-butylene-styrene block copolymer, styrene-ethylene-propylene-styrene block copolymer, crystalline olefin-ethylene butylene crystalline olefin block copolymer, styrene-ethylene-butylene-crystalline olefin block copolymer, styrene-isostyrene block copolymer, styrene-butadiene-styrene block copolymer.

[7] An electroconductive resin composition according to any of [1]-[5], wherein the component (A) comprises at least a polyvinylidene fluoride and a soft acrylic acid resin.

[8] An electroconductive resin composition according to any of [1]-[7], wherein the component (B) comprises at least one kind selected from: metallic materials, carbonaceous materials, electroconductive polymers, and fillers coated with a metallic material, or metallic oxides.

[9] An electroconductive resin composition according to any of [1]-[8], wherein the component (B) is a carbonaceous material including boron in an amount of 0.05-5 mass %.

[10] An electroconductive resin composition according to any of [1]-[9], wherein the component (B) comprises 0.1-50 mass % of vapor-phase grown carbon fiber and/or carbon nanotube, based on the mass of the entire component (B) including the vapor-phase grown carbon fiber and/or carbon nanotube per se.

[11] An electroconductive resin composition according to any of [1]-[10], wherein the vapor-phase grown carbon fiber or carbon nanotube contains boron in an amount of 0.05-5 mass %.

[12] An electroconductive molded product, which has been obtained by molding an electroconductive resin composition according to any of [1]-[11].

[13] An electroconductive molded product according to [12], which has a volume resistivity of 0.1 Ωcm or less, a contact resistance of 0.1 Ωcm$^2$ or less, and a penetration resistance of 0.1 Ωcm or less.

[14] An electroconductive molded product according to [12] or [13], which has a heat conductivity of 1.0 W/m·K or more.

[15] A fuel cell separator, which has been obtained by using a molded product according to any of [12]-[14].

[16] A fuel cell separator according to [15], which has four or more through-holes, has a groove having a thickness of the thinnest portion thereof of 0.1-2 mm, and a depth of 0.1-1.5 mm, and has a volume resistivity of 0.1 Ωcm or less, a contact resistance 0.1 Ωcm$^2$ or less, a heat conductivity of 1.0 W/m·K or more, and a gas permeability of $1 \times 10^{-6}$ cm/sec or less.

BRIEF DESCRIPTION OF DRAWINGS

FIG. 2 is a schematic sectional view for explaining a method of measuring the penetration resistance, which may preferably be used in the present invention.

Figure 1:
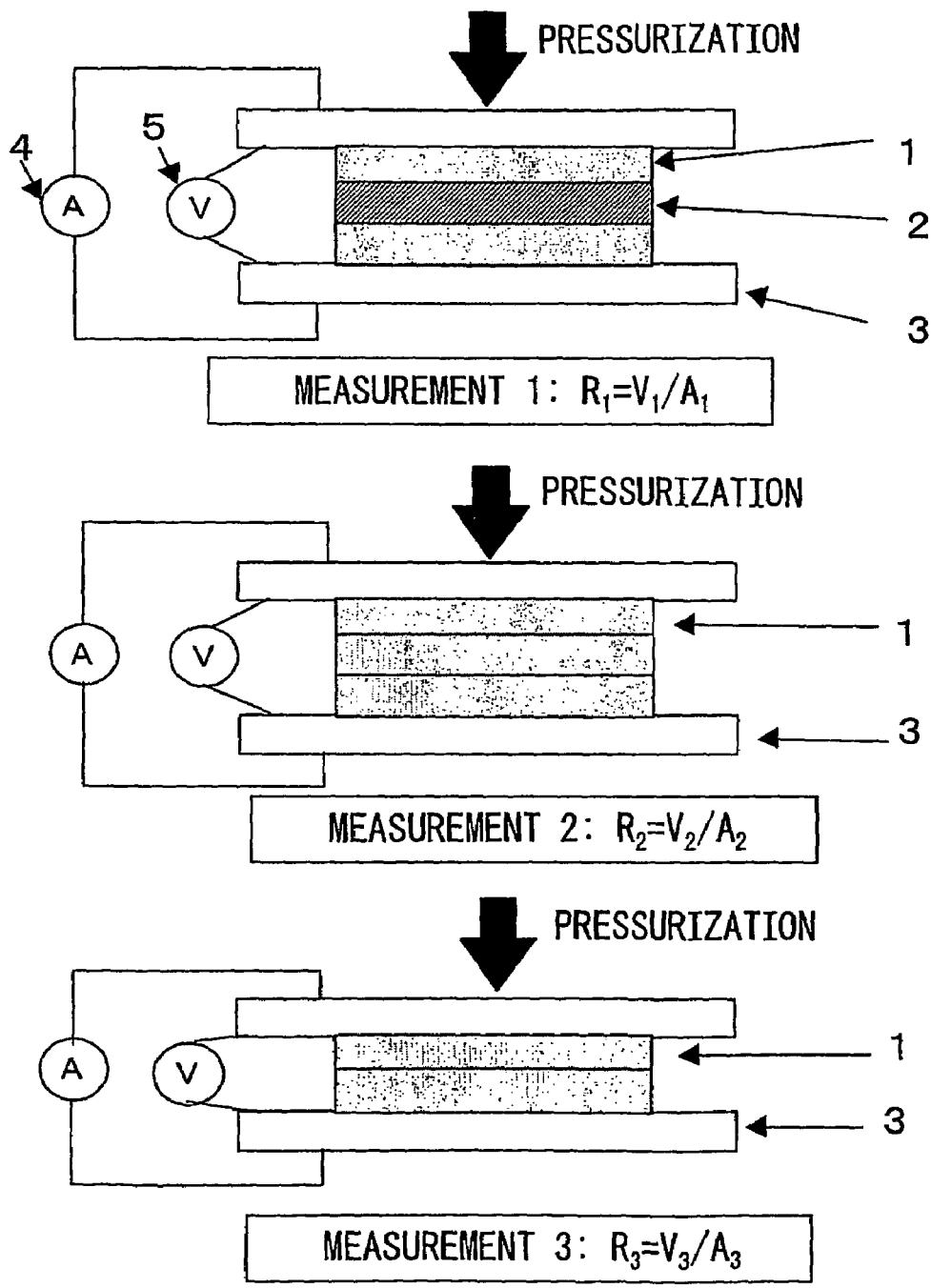
FIG. 1 is a schematic sectional view for explaining a method of measuring the contact resistance of a carbon and a separator, which may preferably be used in the present invention.

In the drawings, the respective reference numerals have the following meanings respectively.
1: carbon
2: test piece
3: brass coated with gold plating
4: constant-current generator
5: voltmeter
11: test piece
12: brass coated with gold plating
13: constant-current generator
14: voltmeter

BEST MODE FOR CARRYING OUT THE INVENTION

Hereinbelow, the present invention will be described in detail, with reference to the accompanying drawings as desired. In the following description, "%" and "part(s)" representing a quantitative proportion or ratio are those based on mass, unless otherwise specifically noted.

(Electroconductive Resin Composition)

The electroconductive resin composition according to the present invention is a resin composition which comprises, at least, a binder (A) of a multi-component polymer type, and an electroconductive material (B) in the form of powder and/or fiber.

(Component (A))

The component (A) is a multi-component polymer-type resin binder which comprises a dispersed phase and a continuous phase, wherein the dispersed phase has a number-average particle size of 0.001-2 µm.

On the other hand, in the combination of polymers which are completely compatible (i.e., mutually soluble) with each other, in the form of a combination of continuous phases, or in the form of phase-separated in a layered shape, there is a limit to the improvement in the electroconductivity. In addition, the technique of mixing plural kinds of polymers which are not completely compatible so that a certain component is predominantly distributed (or localized) in one of these polymers having a higher affinity (Patent Document 1 discloses such a technique) is effective to a certain extent, i.e., effective in providing an electroconductivity in a low electroconductive region of 109-100 Ωcm. However, in a higher electroconductive region of below 100 Ωcm, such a "localization" technique is not effective, because a larger amount of an electroconductive material is inevitably loaded in the polymer.

The component (A) according to the present invention may be provide, e.g., by mixing two or more kinds of polymers, or by using a the block copolymer which has been obtained by the copolymerization of two or more kinds of polymer chains. The two or more kinds of polymers may preferably be those constituting a non-compatible system (i.e., a combination of polymers which do not constitute a completely compatible system).

(Elastomer Component)

The component (A) in the present invention may preferably comprise at least one elastomer component. When the component (A) comprises at least one elastomer component, the contact resistance and penetration resistance can be further improved.

An elastomer is a polymer having rubber-like elasticity in neighborhood of normal temperature. As the elastomer, it is possible to use one or two or more kinds of polymers, selected from: e.g., acrylonitrile-butadiene rubber, hydrogenated nitrile rubber, styrene butadiene rubber, ethylene propylene rubber, ethylene-propylene-diene terpolymerization rubber, ethylene butadiene rubber, fluorine-containing rubber, isoprene rubber, silicone rubber, acrylic elastomer, butadiene rubber, high styrene rubber, chloroprene rubber, urethane rubber, polyether-type rubber, tetrafluoroethylene-propylene rubber, epichlorohydrin rubber, norbornene rubber, butyl rubber, thermoplastic elastomer styrene-type, olefin-type thermoplastic elastomer, urethane-type thermoplastic elastomer, polyester-type thermoplastic elastomer, polyamide-type thermoplastic elastomer, 1,2-polybutadiene-type thermoplastic elastomer, fluorine-containing thermoplastic elastomer, soft acrylic acid resin, etc.

Among these, in view of the resistance to hydrolysis, it is preferred to use as the elastomer, acrylonitrile-butadiene rubber, hydrogenated nitrile rubber, styrene butadiene rubber, ethylene-propylene rubber, ethylene-propylene-diene terpolymerization rubber, ethylene butadiene rubber, isoprene rubber, butadiene rubber, acrylic elastomer, styrene-type thermoplastic elastomer, olefin-type thermoplastic elastomer, 1,2-poly butadiene thermoplastic elastomer, fluorine-type thermoplastic elastomer, soft acrylic acid resin.

The form or type of the dispersed phase of the component (A) is not particularly limited. Specific examples of such a form may include various structures such as one having a so-called "salami sausage structure", i.e., one having a structure such that a large number of island phases are further dispersed in the dispersed phase; and core-shell structure wherein a central phase is present in the dispersed phase, but the form of the dispersed phase usable in the present invention is not these specific examples.

It is possible to observe the form of the component (A) and the size of the dispersed phase, for example, by a transmission electron microscope (hereinbelow, abbreviated as "TEM"), or a scanning electron microscope (hereinbelow, abbreviated as "SEM"). Specific observation examples are described in an article "New Observation Method for Polymers by Electron Microscope" (Japanese Journal of Polymer Science and Technology (Koubunshi Ronbunshu), 56, 684-692, 1999) or in "Easy Guide to Understanding Electron Microscope Techniques (Yokuwakeru Densikenbikyo Gijutsu)" (Japanese Society of Electron Microscopy Technology for Medicine and Biology").

(Number-Average Particle Size)

In the present invention, the number-average particle size of the dispersed phase of the component (A) is 0.001-2 µm, and may preferably be 0.01-1.5 µm, particularly preferably 0.02-1 µm. When the number-average particle size of the dispersed phase is below 0.001 µm, and the effect thereof to improve the electroconductivity is weak. On the other hand, the number-average particle size exceeds 2 µm, the resultant electroconductivity can be decreased.

Further, the number-average particle size of the dispersed phase of the component (A) may preferably be smaller than the number-average particle size or the number-average fiber diameter of the component (B). When the number-average particle size of the dispersed phase of the component (A) is larger than the number-average particle size (or the number-average fiber diameter) of the component (B), the resultant electroconductivity tends to be decreased. When the component (B) comprises a mixture of particles and fibers, the number-average particle (or fiber) sizes of the respective constituents are measured depending on the respective numbers thereof corresponding to the composition ratio so as to determine the number-average particle size of the entire component (B). In the present invention, the ratio (Pa/Pb) of the number-average particle size (Pa) of the dispersed phase of the component (A), and the number-average fiber diameter (Pb) of the component (B) may preferably be 0.8 or less, more preferably 0.7-0.00001 (particularly, 0.6-0.00005).

In the present invention, the number-average particle size of the dispersed phase of the component (A) and the number-average particle size of the component (B) (in the case of the component (B) containing a fiber constituent) are measured in the following method.

Thus, an ultra-thin slice is made from a section of a sample which has been frozen with liquid nitrogen, by using an ultra microtome (trade name: ULTRACUT-N mfd. by Reiherd Co.), is then subjected to osmium coloring, the particle diameter of the dispersed phase is observed by a TEM (JEM-1230, mfd. by JEOL Co.). The resultant TEM images are analyzed by using an image analysis system (Luzex, mfd. by Nireco Co.) with respect to 100 particles to thereby obtain the number-average particle size of the dispersed phase of the component (A).

Further, with respect to the component (B), the particle sizes (inclusive of fiber diameter) of 100 particles are observed by using a SEM (JSM-5510, mfd. by JEOL Co.) and the resultant data are subjected to an image analysis.

The average particle size of the component (B) containing no fiber is measured by using a laser diffraction scattering method by using Microtrac-HRA instrument, mfd. by Nikkiso Co. In this measurement, 50 mg of a sample is weighed and added into 50 ml of distilled water. Further, 0.2 ml of a 2%-Triton (a surfactant, mfd. by Wako Pure Chemical Industries) aqueous solution is added thereto, and the resultant mixture is subjected to ultrasonic dispersion for 3 minutes, and then the average particle size of the component (B) is measured. Herein, "fiber" refers to a material having a ratio of (major axis length/minor axis length) of 10 or more.

(Styrene-Type Thermoplastic Elastomer)

Specific examples of the styrene-type thermoplastic elastomer in the present invention may include: hydrogenated styrene-butadiene rubber, styrene-ethylene-butylene-styrene block copolymer, styrene-ethylene-propylene-styrene block copolymer, crystalline olefin-ethylene butylene crystalline olefin block copolymer, styrene-ethylene-butylene-crystalline olefin block copolymer, styrene-iso-styrene block copolymer, styrene-butadiene-styrene block copolymer, etc. Among these, in view of the dispersibility, it is preferred to use hydrogenated styrene-butadiene rubber, styrene-ethylene-butylene-styrene block copolymer, and styrene-ethylene-propylene-styrene block copolymer.

Herein, the "polyolefin" is a general term for hydrocarbon-type compounds. Specific examples of the polyolefin may include polypropylene, polyethylene, polybutene, polymethyl pentene, etc. Among these, in view of the balance between the of the heat resistance and processability, it is preferred to use polypropylene, or polybutene.

The component (A) in the present invention may preferably comprise a thermoplastic resin and an elastomer in view of the recycling property thereof. In such an embodiment, the mass ratio of the thermoplastic resin and elastomer may preferably be 1:99-99:1. This mass ratio may more preferably be 5:95-95:5, and particularly preferably 10:90-95:5.

(Thermoplastic Resin)

Specific examples of the thermoplastic resin may include: acrylonitrile-butadiene-styrene copolymer, polystyrene, acrylic acid resin, polyvinyl chloride, polyimide, liquid crystal polymer, polyether ether ketone, fluorine-containing resin, polyolefin, polyacetal, polyamide, polyethylene terephthalate, polybutylene terephthalate, polycarbonate, polycycloolefin, polyphenylene sulfide, polyphenylene oxide, polyphenylene sulfone, etc.

Among these, it is preferred to use polystyrene, acrylic acid resin, polyimide, liquid crystal polymer, polyether ether ketone, fluorine-containing resin, polyolefin, polyacetal, polybutylene terephthalate, polycarbonate, polycycloolefin, polyphenylene sulfide, polyphenylene oxide, polyphenylene sulfone as the thermoplastic resin, in an environmental point of view.

Specific preferred examples of a combination of the thermoplastic resin and elastomer in the present invention may include: copolymerization of polystyrene and polybutadiene, copolymerization of polystyrene and isoprene rubber, mixture of polyolefin and styrene-type thermoplastic elastomer, and mixture of polyvinylidene fluoride and acrylic acid resin. In addition, it is also possible to use copolymer of a thermoplastic resin and an elastomer component, polymer alloy which has been obtained by using a compatibility-imparting agent or surfactant, so that the thermoplastic resin and elastomer component are caused to have a micro-phase separation structure, etc.

Among these, it is preferred to use the mixture of polyolefin and styrene-type thermoplastic elastomer, or mixture of polyvinylidene fluoride and acrylic acid resin, in view of the hydrothermal (or hot water) resistance.

(Other Components)

In addition, the component (A) may further contain various additives, as desired. Specific examples thereof may include a component selected from: for example, thermosetting resin, monomer, plasticizer, hardening agent, hardening initiator, hardening auxiliary, solvent, ultraviolet stabilizer, antioxidant, heat stabilizer, antifoaming agent, leveling agent, mold lubricant or releasing agent, lubricant, water repellent, thickener, anti-shrink agent, or hydrophilic property-imparting agent.

(Process for Producing Component (A))

The process for producing component (A) according to the present invention is not particularly limited. Specific examples thereof may include: physical processes such as solution method, emulsion method, and fusion method; chemical processes such as graft polymerization method, block polymerization method, IPN (interpenetrating polymer network); etc.

In the case of the production of the component (A) by using a blend of different kinds of polymers, the fusion method may preferably be used in view of the variety or diversity thereof. Specific techniques of this fusion method are not particularly limited. Specific examples thereof may include blending methods by using any of kneading machines such as roll, kneader, Banbury mixer, and extruder.

(Control of Micro-Phase Separation Structure)

In addition, a desired component (A) can also be obtained by decrease the interfacial tension with the aid of a compatibility-imparting agent, so as to control the micro-phase separation structure, in addition to the blending of the different kinds of polymers. As the method of controlling such a micro-phase separation structure, it is further preferred to use a production process using reactive processing method, as one of the method of using a continuous extruder involving a polymer reaction.

(Copolymer)

The production process for the block copolymer usable as the component (A) is not particularly limited. Specific examples thereof may include: living polymerization such as coordination polymerization, anionic polymerization, cationic polymerization, reaction of polymer having a reactivity terminal group, polymerization of different kinds of monomers by a polymeric initiator, etc.

Specific examples of the block copolymer may include: styrene-butadiene-styrene copolymer, styrene-isoprene-styrene copolymer, styrene-ethylene-butylene-styrene copolymer, styrene-ethylene-propylene-styrene copolymer, crystalline olefin-ethylene-butylene-crystalline olefin copolymer, etc.

In addition, the graft polymer usable as the component (A) may be obtained by using a method of polymerizing a monomer in the presence of a trunk polymer, and therefore the graft polymer may have many kinds and types. Specific examples of the production process therefor may include: e.g., living polymerization, radical polymerization, radiation-induced polymerization, photopolymerization, macro monomer-type polymerization, etc. However, the production process is not limited to these specific examples.

Specific example of the graft polymer may include: acrylonitrile-butadiene-styrene copolymer, butadiene-styrene copolymer, methacrylate-butadiene-styrene copolymer, etc.

(Component (B))

The component (B) constituting the electroconductive resin composition together with the component (A) in the present invention is not particularly limited, as long as the component (B) is an electroconductive material in the form of powder and/or fiber. In view of the electroconductivity, the component (B) may preferably comprise one or a combination of two or more kinds of materials selected from: metallic materials, carbon or carbonaceous materials, electroconductive polymers, and fillers coated with a metallic material, or metallic oxides. The component (B) may more preferably comprise a carbon or carbonaceous material and/or a metallic material.

(Metallic Material)

In view of the electroconductivity, the metallic material may preferably be either one or a combination or composite of two ore more kinds selected from: Ni, Fe, Co, B, Pb, Cr, Cu, Al, Ti, Bi, Sn, W, P, Mo, Ag, Pt, Au, TiC, NbC, TiCN, TiN, CrN, TiB2, ZrB2, and FeB2. Further, it is also possible to process these metallic materials into powder or fiber form.

(Carbonaceous Material)

The carbonaceous material as the component (B) for use in the present invention is not particularly limited. It is preferred to use, for example, at least one or more materials selected from: carbon blacks, carbon fibers, amorphous carbon, expanded graphites, artificial graphites, natural graphites, vapor-phase grown carbon fibers, carbon nanotubes, and fullerenes.

In view of an improvement in the electroconductivity of the carbonaceous material, the carbonaceous material may preferably contain boron in an amount of 0.05 to 5 mass %. If the amount of boron is or less 0.05 mass %, the intended graphite powder having a high electroconductivity is less liable to be obtained. Even if the amount of boron exceeds 5 mass %, the effect of improving the electroconductivity of the carbon material tends to be decreased.

The method of measuring the quantity of boron contained in the carbonaceous material is not particularly limited, but the quantity of the boron can be measured by any measurement method. In the present invention, the values thereof may be those determined by an inductive-type (or inductively coupled) plasma emission spectrometry (hereinafter, abbreviated as "ICP"), or an inductive-type (or inductively coupled) plasma emission spectrometry mass spectrometry (hereinafter, abbreviated as "ICP-MS"). More specifically, sulfuric acid and nitric acid are added to a sample to be measured and microwave-heated (230° C.) to be decomposed (digester method), and perchloric acid ($HClO_4$) is further added to the decomposition product, and the resultant product is diluted with water. Then, the thus obtained sample is subjected to an ICP emission spectrometer, to thereby measure the quantity of the boron therein.

(Method of Incorporating Boron)

Into the carbonaceous material, boron can be incorporated, for example, by a method of adding a boron source such as B in elemental form, $B_4C$, BN, $B_2O_3$ or $H_3BO_3$ to a single substance of natural graphite, artificial graphite, expanded graphite, carbon black, carbon fiber, vapor-phase grown carbon fiber, carbon nanotube or the like, or a mixture of one or more thereof, thoroughly mixing the boron compound, and then graphitizing the mixture at about 2,500 to 3,200° C.

If the mixing of boron compound is not uniform, the resulting graphite powder is not only non-uniform but also highly probably sintered at the graphitization. For attaining uniform mixing, the boron source may preferably be formed into powder having a particle size of 50 μm or less, preferably about 20 μm or less and then mixed with the powder of coke or the like.

If the carbonaceous material as the component (B) does not contain boron and is graphitized, the graphitization degree (i.e., crystallinity) can be decreased and the lattice spacing thereof can be increased. As a result, a graphite powder having a high electroconductivity is less liable to be obtained. The form of boron contained is not particularly limited, as long as boron and/or a boron compound is mixed in the graphite. However, in a preferred form, boron is present between layers of graphite crystal or a boron atom is substituted to a part of carbon atoms constituting the graphite crystal. In a case where a part of carbon atoms is substituted by a boron atom, the bonding between the boron atom and the carbon atom may be in any bonding form such as covalent bonding or ionic bonding.

(Carbon Black)

Specific examples of the carbon black as one of the carbonaceous material may include Ketjen black and acetylene black which are obtained by the incomplete combustion of a natural gas and the like or by the thermal decomposition of acetylene, a furnace carbon obtained by the incomplete combustion of a hydrocarbon oil or a natural gas, and thermal carbon obtained by the thermal decomposition of a natural gas.

(Carbon Fiber)

Specific examples of the carbon fiber to be used as the carbonaceous material (B) may include a pitch-type carbon fiber obtained from heavy oil, by-product oil or coal tar, and a PAN-type carbon fiber obtained from polyacrylonitrile.

(Amorphous Carbon)

The above amorphous carbon may be obtained by using a method wherein a phenolic resin is cured and subjected to a baking treatment, and then crushed into powder; or a method wherein a phenolic resin in the form of powder of spherical or indeterminate shape is cured and subjected to a baking treatment, etc. In order to obtain an amorphous carbon having a high of the electroconductivity, it is suitable to heat-treat the raw material therefor at 2000° C. or more.

(Expanded Graphite Powder)

The expanded graphite powder to be used as the carbonaceous material (B) in the present invention may be, for example, a powder obtained by a method where a graphite having a highly-grown crystal structure such as natural graphite and pyrolytic graphite is dipped in a strongly oxidative solution such as a mixed solution of concentrated sulfuric acid and nitric acid or a mixed solution of concentrated sulfuric acid and aqueous hydrogen peroxide to produce a graphite intercalation compound and the graphite intercalation compound produced is washed with water and rapidly heated to expand the graphite crystal in the C-axis direction, or a powder obtained by once rolling the powder obtained above into a sheet and then pulverizing the sheet.

(Artificial Graphite)

In order to obtain artificial graphite as one example of the carbonaceous material, in general, coke is first produced. The starting material of the coke is petroleum pitch, coal pitch or the like and this starting material is carbonized into coke. From the coke, graphite powder is generally obtained by, for example, a method of pulverizing and then graphitizing the coke, a method of graphitizing the coke itself and then pulverizing the graphitized coke, or a method of adding a binder to the coke, forming and baking the resultant mixture, and graphitizing and then pulverizing the baked product (hereinafter, the coke and the baked product are collectively called "coke and the like") into powder. The starting material coke and the like may preferably be hindered from the growth of crystal and preferably heat-treated at 2,000° C. or less, more preferably 1,200° C. or less.

The method of graphitization is not particularly limited, but the graphitization may be performed by, for example, a method of using an Acheson furnace where the powder is enclosed in a graphite crucible and an electric current is directly passed therethrough, or a method of heating the powder by means of a graphite heating element.

The carbonaceous material (B) such as coke, artificial graphite and natural graphite can be pulverized by using a high-speed rotary mill (e.g., hammer mill, pin mill, cage mill), a ball mill (e.g., roll mill, vibrating mill, planetary mill) or a stirring mill (e.g., bead mill, attritor, flow tube-type mill, annular mill). In addition, a fine pulverizer such as screen mill, turbo mill, super micron mill and jet mill may also be used by selecting the conditions. The carbonaceous material (B) such as coke and natural graphite is pulverized by using such a mill and, by selecting the pulverization conditions and if desired, classifying the powder, whereby the average particle size and the particle size distribution can be controlled.

The method of classifying the carbonaceous material (B) such as coke, artificial graphite and natural graphite may be any method as long as the separation can be attained. For example, sieving or an air classifier such as forced vortex-type centrifugal classifier (e.g., micron separator, turboplex, turbo classifier, super separator) and inertial classifier (e.g., reformed virtual impactor, elbow jet) may be used. Also, a wet precipitation separation method, a centrifugal classification method or the like may be used.

(Vapor-Phase Grown Carbon Fiber, Etc.)

The component (B) in the present invention may preferably contain vapor-phase grown carbon fiber and/or carbon nano tubes in an amount of 0.1-50 mass %, more preferably 0.1-45 mass %, particularly preferably 0.2-40 mass %. If the content is below 0.1 mass %, the improvement in the electroconductivity can be insufficient. On the other hand, if the content exceeds 50 mass %, the resultant molding property is liable to be deteriorated.

The vapor-phase grown carbon fiber or carbon nanotubes may preferably contain boron in an amount of 0.05-5 mass %, more preferably 0.06-4 mass %, particularly preferably be 0.06-3 mass %. If the content is below 0.05 mass %, the effect of the boron incorporation to improve the electroconductivity is liable to be small. On the other hand, if the addition amount thereof exceeds 5 mass %, the amount of the resultant impurity or foreign material becomes large, and the other property is liable to be deteriorated.

The vapor-phase grown carbon fiber to be used as the carbonaceous material (B) may be obtained, for example, by causing thermal decomposition reaction using a starting material organic compound such as benzene, toluene or natural gas together with a hydrogen gas at from 800 to 1,300° C. in the presence of a transition metallic material catalyst such as ferrocene. The obtained vapor-phase grown carbon fiber (e.g., those having a fiber diameter of 0.5-10 μm) may preferably be further subjected to a graphitization treatment at about 2,300 to 3,200° C., more preferably a graphitization treatment together with a graphitization catalyst such as boron, boron carbide, beryllium, aluminum or silicon at about 2,300 to 3,200° C.

(Carbon Nanotube)

The carbon nanotube to be used as the carbonaceous material (B) has recently been noticed by industry not only by its mechanical strength but also by its field emission function and hydrogen absorption function and, furthermore, its magnetic function. This carbon nanotube is also called graphite whisker, filamentous carbon, graphite fiber, extra fine carbon tube, carbon tube, carbon fibril, carbon microtube or carbon nanofiber. The carbon nanotube may generally have a fiber diameter of about 0.5-100 nm.

The carbon nanotube includes a single layer carbon nanotube where a graphite film forming the tube is a single layer, and a multilayer carbon nanotube where the graphite film is composed of multiple layers. In the present invention, either may be used, but a single carbon nanotube is preferred because a cured product having a higher electroconductivity or mechanical strength can be obtained.

The carbon nanotube may be manufactured, for example, by an arc discharge method, a laser evaporation method or thermal decomposition method, which are described in Carbon Nanotube no Kiso (Fundamental Study of Carbon Nanotube), written by Saito and Bando, pages 23 to 57, Corona-Sha (1998). For enhancing the purity, the carbon nanotube obtained may further be purified by a hydrothermal method, a centrifugal separation method, an ultrafiltration method, an oxidation method or the like. For removing impurities, the carbon nanotube may preferably be subjected to a high-temperature treatment in an inert gas atmosphere at about 2,300 to 3,200° C., more preferably a high-temperature treatment at about 2,300 to 3,200° C. in an inert gas atmosphere together with a graphitization catalyst such as boron, boron carbide, beryllium, aluminum and silicon.

(Composition)

With respect to the composition of the component (A) and the component (B), it is preferred that the component (A) constitutes 40-2 mass %, and the component (B) constitutes 60-98 mass %, based on the standard (100 mass %) of (component (A)+component (B)). It is more preferred that the component (A) constitutes 30-5 mass %, and the component (B) constitutes 70-95 mass %. It is particularly preferred that the component (A) constitutes 25-5 mass %, and the component (B) constitutes 75-95 mass %. If the amount of component (A) is below 2 mass %, the resultant molding property is liable to be deteriorated. On the other hand, if the amount of component (A) exceeds 40 mass %, the resultant volume resistivity is liable to be 1 Ωcm or higher.

(Additive)

For the purpose of improving hardness, strength, electroconductivity, moldability, durability, weather resistance, water resistance and the like, the resin composition according to the present invention may further contain, as desired, additives such as glass fiber, whisker, metallic oxide, organic fiber, ultraviolet stabilizer, antioxidant, mold lubricant or releasing agent, lubricant, water repellent, thickener, shrinkage-reducing agent, hydrophilicity-imparting agent, etc.

(Production Process)

The production method of the electroconductive resin composition in the present invention is not particularly limited. It is preferred, for example, that the-mentioned respective components are mixed as uniformly as possible, by using a mixer or kneading machine generally used in the field of resin, such as roll, extruder, kneader, Banbury mixer, Henschel mixer, and planetary mixer.

Further, it is also possible to use a method wherein the component (A) is prepared in advance, and then is mixed with the component (B), or a method wherein the component (A) is kneaded in the presence of the component (B). However, the production process usable in the present invention is not limited to these specific examples.

In the present invention, it is possible that an electroconductive resin composition is prepared by mixing or kneading, and then is crushed or granulated as desired for the purpose of facilitating the supply of the material to a molding machine or a die. In the case of the crushing, it is possible to use a homogenizer, a Wiley crusher, a high-speed rotary crusher (such as hammer mill, pin mil, cage mil, and blender). It is preferred to crush the composition under cooling for the purpose of preventing the cohesion or agglomeration of the respective raw materials. In the case of the granulation, it is possible to use a method wherein an extruder, a luder, co-kneader, etc., is used to form the composition into pellets, or a method wherein a pan-type granulator is used.

(Molded Product)

The process for producing the molded product of the electroconductive resin composition is not particularly limited. Specific examples of the process may include: compression molding, transfer molding, injection molding, cast molding, injection-compression molding or the like. However, the molding process usable in the present invention is not particularly limited to these specific examples specific examples. The molding may preferably be performed while keeping the inside of mold or the mold as a whole under a vacuum state.

For the purpose of obtaining a molded product having a precise thickness, the obtained electroconductive resin composition may be once molded into a sheet form having a predetermined thickness and a predetermined width at a temperature at which the plasticization occurs, by using an extruder, a roll, a calender, etc. In order to conduct molding so as to provide a higher thickness precision, it is preferred that the composition is molded by an extruder, and then rolled by a roll or calender. For the purpose of obviating voids or air in the sheet, it is preferred to conduct the extrusion molding in a vacuum.

The thus obtained sheet may be cut or punched so as to provide an intended size, and the resultant sheet is inserted into a mold, and then is shaped by a compression molding machine to thereby obtain a molded. In order to obtain a good product substantially having no defects, it is preferred to provide a vacuum inside the cavity.

(Bending Modulus of Elasticity)

The molded product of an electroconductive resin composition in the present invention may preferably have a bending modulus of elasticity of 10000 MPa or less. The bending modulus of elasticity may more preferably be 9000 MPa or less, particularly preferably 8000 MPa or less. When the bending modulus of elasticity exceeds 10000 MPa, the contact resistance of the cured product is liable to be lowered.

(Volume Resistivity)

The molded product of an electroconductive resin composition in the present invention may preferably have a volume resistivity of 0.1 $\Omega$cm or less. The volume resistivity may more preferably be 0.05 $\Omega$cm or less, particularly preferably 0.01 $\Omega$cm or less. If the volume resistivity exceeds 0.1 $\Omega$cm, a sufficient electroconductivity is less liable to be obtained in the use thereof wherein a high electroconductivity is demanded.

(Contact Resistance)

The molded product of an electroconductive resin composition in the present invention may preferably have a contact resistance of 0.1 $\Omega$cm$^2$ or less, with respect to a carbon paper. The contact resistance may more preferably be 0.05 $\Omega$cm$^2$ or less, and particularly preferably be 0.01 $\Omega$cm$^2$ or less. If the contact resistance exceeds 0.1 $\Omega$cm$^2$, a sufficient electroconductivity is less liable to be obtained in the use thereof wherein a high electroconductivity is demanded.

(Penetration Resistance)

The molded product of an electroconductive resin composition in the present invention may preferably have a penetration resistance of 0.1 $\Omega$cm or less. The penetration resistance may more preferably be 0.05 $\Omega$cm or less, particularly preferably 0.01 $\Omega$cm or less. When the penetration resistance exceeds 0.1 $\Omega$cm, a sufficient electroconductivity is less liable to be obtained in the use thereof wherein a high electroconductivity is demanded.

(Heat Conductivity)

The molded product of an electroconductive resin composition in the present invention may preferably have a heat conductivity of 1.0 W/m·K or more. The heat conductivity may more preferably be 4.0 W/m·K or more, particularly preferably 10 W/m·K or more. If the heat conductivity becomes smaller than 1.0 W/m·K, the heat radiation from the material becomes worse, so that the temperature thereof is liable to be high during the use of the material.

(Separator)

The process for producing a fuel cell separator according to the present invention is not particularly limited. Specific examples of the process may include: compression molding, transfer molding, injection molding, cast molding, injection-compression molding or the like. However, the molding process usable in the present invention is not particularly limited to these specific examples. The molding may preferably be performed while keeping the inside of mold or the mold as a whole under a vacuum state.

In the compression molding, for enhancing the molding cycle, a multi-cavity mold may preferably be used. A multi-stage press (laminate press) method is more preferred, because a large number of products can be molded by a small output. In the case of a flat-type product, the compression molding may preferably be performed after once forming a non-cured sheet, so as to elevate the plane precision.

In the injection molding, for the purpose of further enhancing the moldability, the molding can be performed in a supercritical state by injecting a carbon dioxide gas from the halfway point of the molding machine cylinder and dissolving the gas in the material. For enhancing the plane precision of a product, an injection-compression method is preferred.

The injection-compression molding method which can be used includes 1) a method of injecting the material in the state of the mold being closed and the locking force being set to zero, 2) a method of injecting the material in the state of the mold being opened to a predetermined position and then closing the mold and 3) a method of injecting the material in the state of the mold being opened and while injecting the material, closing the mold.

(Mold)

The mold to be used in the present invention is not particularly limited. For example, in a case where the solidification of the material is fast, and the fluidity is poor, it is preferred to use the insulated runner mold wherein an insulation layer is provided in the mold cavity. In addition, it is further preferred to use a mold wherein a temperature profile system has been introduced so that the mold temperature can be increased or decreased during the molding. Specific examples of the type or structure of the temperature profile system may include: a system utilizing the switching of induction heating and a refrigerant (such as air, water, oil); or a system utilizing the switching of a heat medium (heated water, heating oil) and a refrigerant; etc. However, the temperature profile system usable in the present invention is not limited to these specific examples.

With respect to the mold temperature, it is important to select and find an optimum temperature according to the kind of the composition. The temperature may be appropriately selected according to the kind of the material, but for example, a temperature of 90 to 200° C. for 10 to 1,200 seconds may be selected. When the resultant molded product is taken out at a high temperature, the product may be cooled in some cases. In such a case, the cooling method is not particularly limited. Specific examples thereof may include a method wherein the molded product is cooled by sandwiching the molded product between cooling plates, or a method wherein the molded product is cooled together with the mold containing therein the molded product per se.

The fuel cell separator according to the present invention wherein at least one flow channel for a gas has been formed on one side or both sides thereof may be obtained by molding or shaping the electroconductive resin composition according to the present invention using the-mentioned molding method. It is possible that the electroconductive resin composition according to the present invention is once cured, and then the-mentioned at least one flow channel (such as groove) is formed therein or thereon by machine work. It is also possible that the formation of the flow channel is conducted by compression molding, stamp molding, etc., using a mold having a reversed configuration corresponding to the flow channel.

The cross-section of the flow channel and the shape of the flow channel in the separator according to the present invention are not particularly limited. Specific examples of the flow channel cross-section may include a rectangle, a trapezoid, a triangle, semicircular, etc. Specific examples of the flow channel shape may include a straight type, meandering type, etc. The flow channel may preferably have a width of 0.1-2 mm, and a depth of 0.1-1.5 mm.

The thinnest portion of the separator according to the present invention may preferably have a thickness of 1 mm or less, more preferably about 0.8 mm or less. When the thinnest portion of the separator exceeds 1 mm, the separator have a larger thickness and the voltage drop in a cell due to the resistance of the separator is liable to be undesirably large.

The separator for fuel cells according to the present invention may generally have, e.g., four or more through-holes which function as manifold to flow a gas and water therethrough. The method of forming the through-hole is not particularly limited. Specific examples thereof may include a method wherein the through-hole is formed at the time of the molding of the separator; a method wherein the through-hole is formed by cutting, etc., after the molding of the separator.

(Characteristics of Separator)

The fuel cell separator according to the present invention may preferably have a volume resistivity of 0.1 Ωcm or less, more preferably 0.05 Ωcm or less, particularly 0.01 Ωcm or less. If the volume resistivity exceeds 0.1 Ωcm, a sufficient electroconductivity is less liable to be obtained in the use thereof wherein a high electroconductivity is demanded.

The fuel cell separator according to the present invention may preferably have a contact resistance (with respect to carbon paper) of 0.1 cm$^2$ or less, more preferably 0.05 Ωcm$^2$ or less, particularly preferably 0.05 Ωcm$^2$ or less. If the contact resistance exceeds 0.1 Ωcm$^2$, a sufficient electroconductivity is less liable to be obtained in the use thereof wherein a high electroconductivity is demanded.

The fuel cell separator according to the present invention may preferably have a heat conductivity of 1.0 W/m·K or more, more preferably 4.0 W/m·K or more, still more preferably 10 W/m·K or more. If the heat conductivity is below 1.0 W/m·K, the heat radiation from the material becomes worse, so that the temperature thereof is liable to be high during the use of the material.

The fuel cell separator according to the present invention may preferably have a gas permeability of $1 \times 10^{-6}$ cm/sec or less, more preferably $1 \times 10^{-7}$ cm/sec or less, particularly preferably $1 \times 10^{-8}$ cm/sec or less. The permeability may be measured in accordance with JIS K 7126 A method, wherein the permeability is measured by using helium gas at 23° C.

EXAMPLES

Hereinbelow, the present invention will be described in more detail by referring to Examples, but the present invention is by no means limited to these Examples.

The respective properties of a molded product were measured in the following manner.

(Volume Resistivity)

The volume resistivity was measured by the four-probe method in accordance with the JIS K 7194.

(Contact Resistance)

The contact resistance was measured by a four-probe method as shown in FIG. 1, to thereby obtain three contact resistance values (Rc) with respect to a carbon paper (TGP-H-060, mfd. by Toray Industries, Inc.), and the contact resistance (Rc) was calculated by using the following formula (1).

More specifically, a sample piece (20 mm×20 mm×1 mm), a carbon paper (20 mm×20 mm×0.19 mm), and a gold-plated brass plate (20 mm×20 mm×0.5 mm) were used. The sample was sandwiched with the carbon papers, and then the resultant superposition was sandwiched with two of the gold-plated brass plates. In this state, the resultant superposition was uniformly pressed at a pressure of 2 MPa and a constant-current of 1 A was flown between the gold-plated brass plates in the penetration direction between brass plates, to thereby measure the resultant voltage between the brass plates. The first resistance value ($R_1$) was calculated by using these values of the current and voltage (Measurement 1).

The second resistance value ($R_2$) was determined in the same manner as the measurement of the first resistance value ($R_1$) except that three sheets of the carbon papers were sandwiched with the gold-plated brass plates (Measurement 2). Further, the third resistance value ($R_3$) was determined in the same manner as the measurement of the first resistance value ($R_1$) except that two sheets of the carbon papers were sandwiched with the gold-plated brass plates (Measurement 3).

Based on the thus obtained three resistance values, the contact resistance (Rc) was calculated by using the following formula (1).

$$R_c = (R_1 + R_2 - 2R_3) \times S/2 \tag{1}$$

Rc: Contact resistance ($\Omega cm^2$),
S: Contact surface area ($cm^2$),
$R_1$: Resistance value ($\Omega$) obtained in Measurement 1,
$R_2$: Resistance value ($\Omega$) obtained in Measurement 2, and
$R_3$: Resistance value ($\Omega$) obtained in Measurement 3.

(Penetration Resistance)

Penetration resistance was measured by a four-probe method as shown in FIG. 2.

More specifically, four sample pieces (50 mm×50 mm×2 mm) were superposed, and were sandwiched with two of the gold-plated brass plates. In this state, the resultant superposition was uniformly pressed at a pressure of 2 MPa and a constant-current of 1 A was flown between the gold-plated brass plates in the penetration direction between brass plates, to thereby measure the resultant voltage between the brass plates. The first resistance value ($R_1$) was calculated by using these values of the current and voltage (Measurement 1).

The second resistance value ($R_2$) was determined in the same manner as the measurement of the first resistance value ($R_1$) except that two sample pieces were superposed, and were sandwiched with two of the gold-plated brass plates (Measurement 2).

Based on the thus obtained two resistance values, the penetration resistance (Rt) was calculated by using the following formula (2). That is, a subtraction was obtained from the values $R_1$ and $R_2$, and the resultant subtraction was multiplied by the Contact surface area (S), and then divided by the thickness (t) of two sample pieces, to thereby calculate the penetration resistance (Rt).

$$R_t = (R_1 - R_2) \times S / t \quad (2)$$

Rc: Penetration resistance ($\Omega cm$),
S: Contact surface area ($cm^2$),
$R_1$: Resistance value ($\Omega$) obtained in Measurement 1,
$R_2$: Resistance value ($\Omega$) obtained in Measurement 2, and
t: thickness of two sample pieces.

(Bending Strength, Bending Elastic Modulus, and Bending Strain)

The bending strength, bending elastic modulus and bending strain were measured by using Autograph (AG-10kNI), mfd. by Shimadzu Corporation. In accordance with JIS K 6911, a test piece (80 mm×10 mm×4 mm) was subject to the measurement in the three-point bending strength method under the conditions of a span interval of 64 mm, and a bending rate of 1 mm/min.

(Heat Conductivity)

The heat conductivity was measured by a laser flash method ($t_{1/2}$ method), by using a laser flash thermal constant-measuring apparatus (LF/TCM FA8510B, mfd. by Rigaku Denki Co.). More specifically, a sample (diameter $\phi$: 10 mm, thickness 1.7 mm) was subjected to a measurement under conditions of a temperature of 80° C., and irradiation with ruby laser light in vacuum (excitation voltage: 2.5 kV).

The materials used in Examples are as follows.

Component (A): The respective binders as shown in the following Table 1.

As a polypropylene, SunAllomer PX900N mfd. by SunAllomer Ltd. was used. As a styrene-ethylene-butylene-styrene block copolymer (SEBS), Kraton G1652 mfd. by Kraton Polymer Japan Co., Ltd. was used. As at hydrogenated styrene-butadiene rubber (H-SBR) and an ethylene-propylene-diene copolymer (EPDM), Dynaron 1320 P and EP 57 P, both mfd. by JSR Co., Ltd. were used. As a polyvinylidene fluoride (PVDF), Neoflon VW-410 mfd. by Daikin Industries, Ltd. was used. As a soft acrylic acid resin, Parapet SA-FW001 mfd. by Kuraray Co., Ltd. was used.

TABLE 1

|  |  | A1 | A2 | A3 | A4 | A5 | A6 |
|---|---|---|---|---|---|---|---|
| Polypropylene | SunAllomer' PX900N | 60 | 60 |  | 60 | 100 |  |
| SEBS | Krayton' G1652 | 40 |  |  |  |  |  |
| H-SBR | Dynaron' 1320P |  | 40 |  |  |  |  |
| EPDM | JSR EP' EP57P |  |  |  | 40 |  |  |
| PVDF | Neoflon' VW-410 |  |  | 80 |  |  | 100 |
| Soft acrylic resin | Parapet' SA-FW001 |  |  | 20 |  |  |  |
| Average particle size of dispersed phase | (μm) | 0.7 | 0.1 | 0.3 | 2.2 | — | — |

<Component (B)>: Electroconductive Material

<B-1>: Graphite Fine Powder Containing Boron

MC Coke mfd. by MC Carbon K.K., which is a non-needle type coke was coarsely pulverized into a size of 2 to 3 mm or less by a pulverizer [mfd. by Hosokawa Micron K.K.]. The coarsely pulverized product was finely pulverized by a jet mill (IDS2UR, mfd. by Nippon Pneumatic K.K.). Thereafter, the thus obtained powder was classified so as to adjust the particle size thereof to a desired value. The particles of 5 μm or less were removed by air classification by using a turbo classifier (TC15N, mfd. by Nisshin Engineering K.K.).

To a portion (14.4 kg) of the finely pulverized product, 0.6 kg of boron carbide ($B_4C$) was added and then mixed therewith by a Henschel™ mixer at 800 rpm for 5 minutes. The resulting mixture was enclosed in a graphite crucible with a cover having an inside diameter of 40 cm and a capacity of 40 liters. The crucible was sealed and placed in a graphitization furnace using a graphite heater and the powder was graphitized at a temperature of 2,900° C. in an argon gas atmosphere. The resultant product was allowed to cool, the resultant powder was taken out from the crucible to thereby obtain 14 kg of graphite powder. The thus obtained graphite powder had an average particle size of 20.5 μm, and a boron content of 1.9 mass %.

<B-2>: Vapor-Phase Grown Carbon Fiber

A mixture of vapor-phase grown carbon fiber ((hereinafter, referred to as "VGCF" (registered trade mark)) mfd. by Showa Denko K.K., and component (B-1), i.e., graphite fine powder 95 mass % of the component (B-1) and 5 mass % of VGCF were mixed by using a Henschel mixer. The resultant carbon material mixture had an average particle size of 12.4 μm, and a B content of 1.3 mass %.

As the vapor-phase grown carbon fiber, VGCF-G (fiber diameter 0.1-0.3 μm, fiber length 10-50 μm), mfd. by Showa Denko K.K., was used.

<B-3>: A mixture of carbon nanotube (hereinafter, referred to as "CNT") and component (B-1), i.e., graphite fine powder 95 mass % of the component (B-1) and 5 mass % of CNT were mixed by using a Henschel mixer. The resultant carbon material mixture had an average particle size of 9.2 μm, and a B content of 1.2 mass %.

The carbon nanotube was obtained in the following manner.

A hole having a diameter of 3 mm, and a depth of 30 mm was bored in a graphite rod having a diameter of 6 mm and a length of 50 mm from the tip thereof along the center axis, and the hole was packed with a mixture powder of rhodium (Rh): platinum (Pt):graphite (C)=1:1:1 (mass ratio), to thereby form an anode. On the other hand, there was formed a cathode having a diameter of 13 mm and a length of 30 mm which comprised graphite having a purity of 99.98 mass %.

These electrodes were disposed in a reaction container so that they were disposed opposite to each other, and the electrodes were connected to a direct current power supply. The inside of the reaction container was replaced with helium gas having a purity of 99.9 vol. %, and direct current arc discharge was conducted. Thereafter, the soot which had been attached to the inner wall of the reaction container (chamber soot), and the soot which had been accumulated on the cathode (cathode soot) were collected. The pressure in the reaction container and the electric current were 600 Torr and 70 A, respectively. During the reaction, the anode and the cathode were operated so that the gap between the anode and the cathode always became 1-2 mm.

The thus collected soot was charged into a mixture solvent comprising water and ethanol (mixing mass ratio=1:1), and then was dispersed therein using ultrasound, and the resultant dispersion was collected and the solvent was removed by using a rotary evaporator. The thus obtained sample was dispersed in a 0.1%-aqueous solution of benzalkonium chloride as a cationic surfactant by using supersonic waves, and then was subjected to centrifugal separation at 5000 rpm for 30 min., and the resultant dispersion was collected. Further, the dispersion was purified by heat-treating the dispersion in air at 350° C. for five hours, to thereby obtain carbon nanotube having a fiber diameter of 1-10 nm and a fiber length of 0.05-5 μm.

The kinds and amount ratios of the component (A) and the component (B) which were used in the following Examples/ and Comparative Example are shown in the following Table 2.

TABLE 2

|  |  | Ex. 1 | Ex. 2 | Ex. 3 | Ex. 4 | Ex. 5 | Comp. Ex. 1 | Comp. Ex. 2 | Comp. Ex. 3 | Comp. Ex. 4 |
|---|---|---|---|---|---|---|---|---|---|---|
| resin composition | A1 | 20 |  | 20 | 20 | 15 |  |  |  |  |
|  | A2 |  | 20 |  |  |  |  |  |  |  |
|  | A4 |  |  |  |  |  |  | 20 |  | 15 |
|  | A5 |  |  |  |  |  |  |  | 20 |  |
| electroconductive substance | B1 | 80 | 80 |  |  | 85 | 80 | 80 | 85 | 85 |
|  | B2 |  |  | 80 |  |  |  |  |  |  |
|  | B3 |  |  |  | 80 |  |  |  |  |  |

Examples 1-5, and Comparative Examples 1-4

The respective raw materials as shown in the Tables 1 and 2 were kneaded by using Labo-Plastomill (mfd. by Toyo Seiki Seisakusho K.K., Model 50C150) for 7 min., at a temperature of 200° C., and 45 rpm. Each of the resultant kneaded product was charged into a mold for providing a plate of 100 mm×100 mm (having different thicknesses depending on the item to be tested for various properties), and was heated at 230° C., as a preheating treatment of 3 min., and then for 3 min., under applied pressure of 30 MPa by using a 50t-compression molding machine. Then, the resultant product was cooled by using a cooling press at a temperature of 25° C., and a pressure of 15 MPa for two minutes, to thereby obtain a cured product.

The results thus obtained in the respective Examples and Comparative Examples are summarized the following Table 3.

TABLE 3

|  |  | Ex. 1 | Ex. 2 | Ex. 3 | Ex. 4 | Ex. 5 | Comp. Ex. 1 | Comp. Ex. 2 | Comp. Ex. 3 | Comp. Ex. 4 |
|---|---|---|---|---|---|---|---|---|---|---|
| Volume resistivity | mΩcm | 23.1 | 20.1 | 19.8 | 13.6 | 5.8 | 45.3 | 25 | 21.2 | 6.7 |
| Contact resistance | mΩcm$^2$ | 7.4 | 5.4 | 4.6 | 3.1 | 2.9 | 15.6 | 28.6 | 8.2 | 3.6 |
| Penetration resistance | mΩcm | 73.4 | 42.2 | 35.2 | 18.2 | 12.2 | 2690 | 1310 | 94.4 | 39.5 |
| bending strength | MPa | 32.1 | 18.6 | 36.9 | 42.3 | 25.5 | 13.8 | 49.5 | 14.2 | 46.7 |
| bending elastic modulus | GPa | 4.2 | 3.4 | 5.2 | 6.3 | 1.79 | 2.1 | 10 | 1.23 | 10.2 |
| bending strain | % | 3.6 | 9.8 | 4.1 | 4.5 | 2.0 | 5.6 | 0.79 | 4 | 0.67 |

Example 6, Comparative Example 5

TABLE 4

|  |  | Ex. 6 | Comp. Ex. 5 |
|---|---|---|---|
| resin composition | A3 | 30 |  |
|  | A6 |  | 30 |
| electroconductive substance | B1 | 70 | 70 |

The respective raw materials as shown in the Tables 1 and 4 were kneaded by using Labo-Plastomill (mfd. by Toyo Seiki Seisakusho K.K., Model 50C150) for 7 min., at a temperature of 200° C., and 40 rpm. Each of the resultant kneaded product was charged into a mold for providing a plate of 100 mm×100 mm (having different thicknesses depending on the item to be tested for various properties), and was heated at 220° C., as a preheating treatment of 3 min., and then for 3 min., under applied pressure of 18 MPa by using a 50t-compression molding machine. Then, the resultant product was cooled by using a cooling press at a temperature of 25° C., and a pressure of 18 MPa for two minutes, to thereby obtain a cured product.

The results thus obtained in the respective Examples and Comparative Examples are summarized the following Table 5.

TABLE 5

|  |  | Ex. 6 | Comp. Ex. 6 |
|---|---|---|---|
| Volume resistivity | mΩcm | 9.7 | 14 |
| Contact resistance | mΩcm$^2$ | 2.8 | 5.2 |
| Penetration resistance | mΩcm | 10 | 34 |
| bending strength | MPa | 25.6 | 52.2 |
| bending elastic modulus | GPa | 5.4 | 11.2 |
| bending strain | % | 1.21 | 0.82 |

Example 7

The composition obtained in Example 5 was charged into a mold capable of providing a plate having a size of 280×200×1.5 mm and having 1 mm-pitch and 0.5 mm-depth grooves on both sides thereof, and was heated at 230° C. for 3 min., under applied pressure of 50 MPa by using a 380t-compression molding machine. Then, the mold was cooled to 100° C., to thereby obtain a flat plate in the form of a fuel cell separator having grooves on both sides thereof, and having a volume resistivity of 6.8 mΩcm, a contact resistance of 3.2 mΩcm, a heat conductivity of 18 W/m·K, and a gas permeability of 3.6×10$^{-9}$ cm$^2$/sec.

As shown in the Table 3, the molded products of the electroconductive resin composition comprising a binder in the present invention was superior in the electroconductivity. Particularly, these molded products had a low contact resistance, and a penetration resistance, so that they could effectively exhibit an electroconductivity.

Further, as shown in the Table 5, a higher electroconductivity was attained by using the binder according to the present invention, even when with the same addition amount of the electroconductive material. In addition, as shown in Example 7, the molded product according to the present invention showed excellent characteristics as a separator for fuel cells.

INDUSTRIAL APPLICABILITY

As described hereinabove, the electroconductive resin composition according to the present invention may easily be subjected to molding and therefore, is optimal as a composite material in a field (such as fuel cell separator) where the thickness precision is required. Further, the cured product thereof can reproduce the electroconductivity or heat conductivity of the carbonaceous material such as graphite substantially without a limit and can have very high performance. Accordingly, the composition, cured product thereof, or product or article according to the present invention is useful for various parts in various field such as electronics, electric, mechanical and transportation equipment. Particularly, the present invention can provide various materials or parts, which are usable in the fields of capacitors or various current collectors for cells or batteries, electromagnetic wave shielding materials, electrodes, heat-radiating plates, heat-radiating parts, electronics parts, semiconductor-related parts, bearings, PTC elements, brushes, and fuel cell separators.

The invention claimed is:

1. An electroconductive resin composition, comprising at least:
   a multi-component polymer-type resin binder (A) comprising a dispersed phase and a continuous phase, and having a number-average particle size of dispersed phase of 0.001-2 μm, and an electroconductive material (B) in the form of powder, fiber, or combination thereof;
   wherein the number-average particle size of the dispersed phase in the component (A) is smaller than the number-average particle size or number-average fiber diameter of the component (B),
   wherein the multi-component polymer-type resin binder (A) has a micro-phase separation structure comprising a resin component constituting the dispersed phase and a resin component constituting the continuous phase, and
   wherein the component (A) constitutes 40-2 mass %, and the component (B) constitutes 60-98 are mass %, based on the total amount of (component (A)+component (B)) of 100 mass %.

2. An electroconductive resin composition according to claim 1, wherein at least one component contained in the component (A) is an elastomer component.

3. An electroconductive resin composition according to claim 1, wherein the component (A) comprises 1-99 mass % of a thermoplastic resin, and 99-1 mass % of an elastomer.

4. An electroconductive resin composition according to claim 1, wherein the component (A) comprises a composition of a polyolefin, and one or plural kinds selected from: hydrogenated styrene-butadiene rubber, styrene-ethylene-butylene-styrene block copolymer, styrene-ethylene-propylene-styrene block copolymer, crystalline olefin-ethylene butylene crystalline olefin block copolymer, styrene-ethylene-butylene-crystalline olefin block copolymer, styrene-iso-styrene block copolymer, styrene-butadiene-styrene block copolymer.

5. An electroconductive resin composition according to claim 1, wherein the component (A) comprises at least a polyvinylidene fluoride and a soft acrylic acid resin.

6. An electroconductive resin composition according to claim 1, wherein the component (B) comprises at least one kind selected from: metallic materials, carbonaceous materials, electroconductive polymers, and fillers coated with a metallic material, or metallic oxides.

7. An electroconductive resin composition according to claim 1, wherein the component (B) is a carbonaceous material including boron in an amount of 0.05-5 mass %.

8. An electroconductive resin composition according to claim 1, wherein the component (B) comprises 0.1-50 mass % of vapor-phase grown carbon fiber, carbon nanotube or combination thereof, based on the mass of the entire component (B) including the vapor-phase grown carbon fiber and/or carbon nanotube per se.

9. An electroconductive resin composition according to claim 8, wherein the vapor-phase grown carbon fiber, carbon nanotube, or combination thereof contains boron in an amount of 0.05-5 mass %.

10. An electroconductive molded product, which has been obtained by molding an electroconductive resin composition according to claim 1.

11. An electroconductive molded product according to claim 10, which has a volume resistivity of 0.1 $\Omega$cm or less, a contact resistance of 0.1 $\Omega$cm$^2$ or less, and a penetration resistance of 0.1 $\Omega$cm or less.

12. An electroconductive molded product according to claim 10, which has a heat conductivity of 1.0 W/m·K or more.

13. A fuel cell separator, which has been obtained by using a molded product according to claim 10.

14. A fuel cell separator according to claim 13, which has four or more through-holes, has a groove having a thickness of the thinnest portion thereof of 0.1-2 mm, and a depth of 0.1-1.5 mm, and has a volume resistivity of 0.1 $\Omega$cm or less, a contact resistance 0.1 $\Omega$cm$^2$ or less, a heat conductivity of 1.0 W/m·K or more, and a gas permeability of $1\times10^{-6}$ cm/sec or less.

15. An electroconductive resin composition, comprising at least:
- a multi-component polymer-type resin binder (A) comprising a dispersed phase and a continuous phase, and having a number-average particle size of dispersed phase of 0.001-2 µm, and an electroconductive material (B) in the form of powder, fiber, or combination thereof;
- wherein the number-average particle size of the dispersed phase in the component (A) is smaller than the number-average particle size or number-average fiber diameter of the component (B),
- wherein the multi-component polymer-type resin binder (A) has a micro-phase separation structure comprising a resin component constituting the dispersed phase and a resin component constituting the continuous phase, and
- wherein a ratio (Pa/Pb) of the number-average particle size (Pa) of the dispersed phase of the component (A) and the number-average particle size or the number-average fiber diameter (Pb) of the component (B) is 0.8 or less.

16. An electroconductive resin composition according to claim 15, wherein at least one component contained in the component (A) is an elastomer component.

17. An electroconductive resin composition according to claim 15, wherein the component (B) comprises at least one kind selected from: metallic materials, carbonaceous materials, electroconductive polymers, and fillers coated with a metallic material, or metallic oxides.

18. An electroconductive resin composition according to claim 15, wherein the component (B) is a carbonaceous material including boron in an amount of 0.05-5 mass %.

19. An electroconductive resin composition according to claim 15, wherein the component (B) comprises 0.1-50 mass % of vapor-phase grown carbon fiber, carbon nanotube, or combination thereof, based on the mass of the entire component (B) including the vapor-phase grown carbon fiber, carbon nanotube, or combination thereof per se.

20. An electroconductive resin composition according to claim 19, wherein the vapor-phase grown carbon fiber, carbon nanotube, or combination thereof contains boron in an amount of 0.05-5 mass %.

* * * * *